United States Patent [19]

Ishibashi

[11] 4,443,023
[45] Apr. 17, 1984

[54] METHOD AND DEVICE FOR DISPLACING THE HEAD TUBE OF A BICYCLE

[75] Inventor: Hideyuki Ishibashi, Ageo, Japan

[73] Assignee: Bridgestone Cycle Co., Ltd., Tokyo, Japan

[21] Appl. No.: 378,042

[22] Filed: May 14, 1982

[51] Int. Cl.³ .................................................. B62K 19/32
[52] U.S. Cl. ........................................ 280/278; 280/279; 280/287; 403/DIG. 8
[58] Field of Search ............... 280/278, 287, 276, 279, 280/87.05; 403/65, 72, 119, DIG. 8; 52/655, 645

[56] References Cited

U.S. PATENT DOCUMENTS 583,078  5/1897  Owen ................................. 280/278

FOREIGN PATENT DOCUMENTS 41165  11/1929  Denmark ........................... 280/287
107690  12/1898  Fed. Rep. of Germany ...... 280/287
1114011 63h  10/1955  Fed. Rep. of Germany ...... 280/278

Primary Examiner—John A. Pekar
Attorney, Agent, or Firm—Jordan and Hamburg

[57] ABSTRACT

A bicycle frame includes a chain stay structure, a seat tube extending from the chain stay structure, an inclined down tube pivotally connected to the chain stay structure and disposed forward of the seat tube, a top longitudinally extending element connected between the seat tube and the down tube, a head pipe mounted on the down tube, and an eccentric device connecting the top element to at least one of the tubes to thereby provide for adjusting the pivotal position of the down tube and thereby the position of the head pipe relative to the seat tube.

6 Claims, 6 Drawing Figures

METHOD AND DEVICE FOR DISPLACING THE HEAD TUBE OF A BICYCLE

BACKGROUND OF THE INVENTION

The present invention relates to a method and device for displacing a head tube of a bicycle and, more particularly, to a method and apparatus in which the apparent length of the top tube is changed by operating the attaching portions of the top tube to cause a down tube to tilt to thereby adjust the vertical angle of the head pipe.

In riding a bicycle, it is essential for the rider to keep the correct posture or position in order to avoid fatigue and to ensure safety. Usually, however, it is quite difficult to reconstruct the bicycle to suit various riders of different sizes of bodies. This is because the constituents of the frame are all fixed. In fact, among various parts of the bicycle, only the height of the saddle is adjustable to suit the side of the rider's body.

Under this circumstance, the present invention aims at making it possible to adjust the distance between the rider's body and the rider's hands gripping the handle bar, through displacing the head tube on which the handle bar is mounted.

A preferred embodiment of the invention will be described hereinunder with specific reference to the accompanying drawings.

DESCRIPTION OF THE PREFERRED EMBODIMENTS

Figure 1:
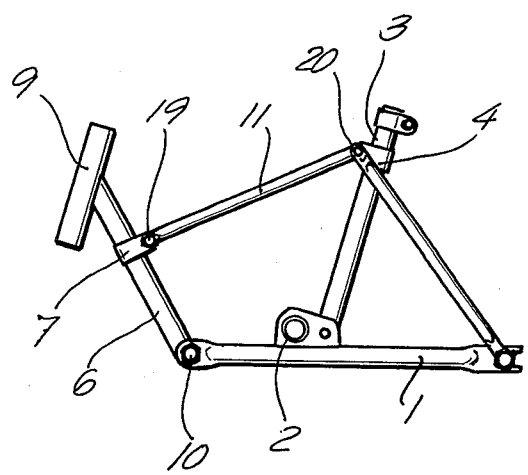
FIG. 1 is a side elevational view of one embodiment of the invention.

Referring to the drawings, a bicycle in accordance with the invention has a chain stay 1 carrying a hanger bracket 2 to which is fixed a seat tube 3. Also, a down tube 6 is pivotally connected to the front end of the chain stay 1 at an inclination to the latter. The seat tube 3 and the down tube 6 are connected to each other through a top tube 11. The apparent length of the top tube 11 is adjustable by displacing the top tube 11 by means of one or both of attaching brackets provided at both ends of the top tube, thereby to suitably tilt the down tube 6 to adjust the vertical elevation angle of the head pipe 9. The seat pipe 3 is fixed to an intermediate portion of the chain stay 1 by means of the hanger bracket 2, while the down tube 6 is pivotally secured to the front end of the chain stay 1 by means of a pivot shaft 10.

A 00 head pipe 9 is secured to the upper end of the down tube 6 and the non-illustrated handle bar is attached to this head pipe 9.

Figure 2:
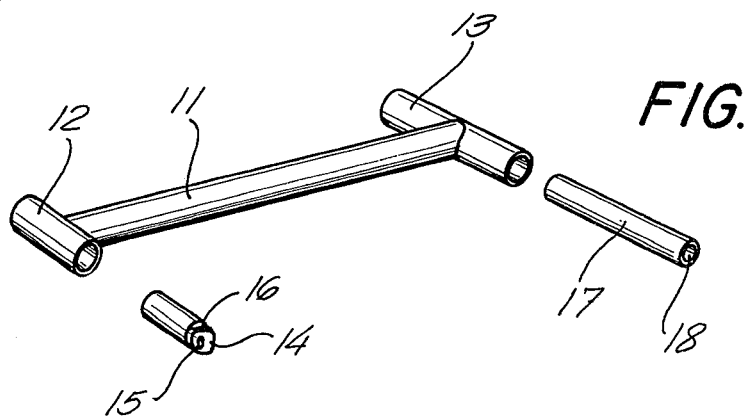
FIG. 2 is a perspective and exploded view of an essential part of FIG. 1.

The bicycle frame is formed by interconnecting the a down tube bracket 7 provided on the down tube 6 and a seat tube bracket 4 provided on the seat tube 3. As will be seen from FIG. 2, the top tube 11 is provided at its both ends with a front bearing 12 and a rear bearing 13. These bearings 12,13 receive collars 14,17 having lengths slightly greater than those of the corresponding bearings. Bores 18,15 of the collars 17,14 receive bolts 20,19 for connecting bore 5 of the seat tube bracket 4 and for connecting bore 8 of the down tube bracket 7, so as to prevent the down tube 6 from tilting. The bore of at least one of the collars 14,17, e.g. the bore 15 of the collar 14, is formed with an eccentricity at the outer peripheral surface of the collar. As a consequence, it is possible to increase and decrease the distance between the axes of the connecting bores 5,8 of the seat tube bracket 4 and the down tube bracket 7 by rotating the collar 14.

In screwing and fixing the collars 14,17 in the front and rear bearings 12 and 13, the collars 14, 17 may be provided at their one ends with engaging portions 22 having diameters greater than the barrel portions, and the inner surfaces of the engaging portions 22 are provided with a convexity or concavity which fit the concavity or convexity formed in the end surfaces of the front and rear bearings 12,13. By so doing, it becomes possible to easily determine the rotational directions of the collars 14,17 in relation to the front and rear bearings 12,13 and to enhance the stability after joining.

In consequence, the down tube 6 is pivoted and tilted back and forth around the axis of the shaft 10 to permit the adjustment of the elevation angle of the head pipe 9.

For efficiency, the eccentric collar 14 may be provided at its end with a retaining portion 16 having two parallel surfaces for retaining a wrench or the like for rotating the collar.

Figure 3:
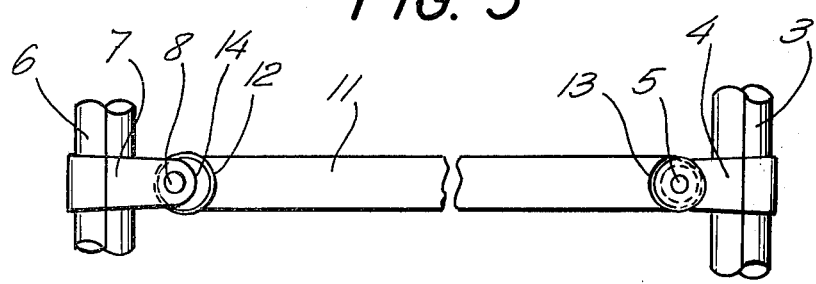
FIGS. 3 and 4 illustrate examples of the adjustment of the eccentric collar.
Figure 4:
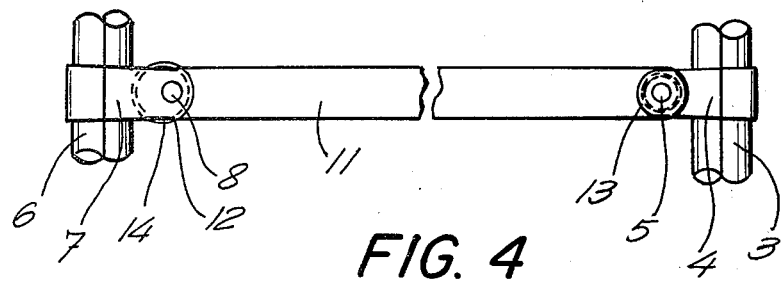
Figure 5:
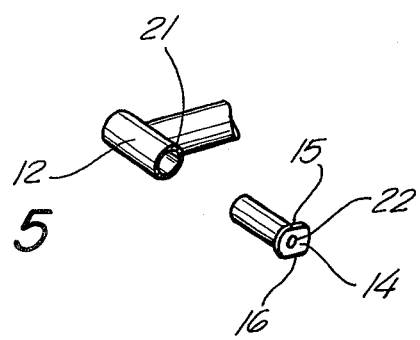
FIG. 5 is a perspective view of an engaging portion according to another embodiment of the invention.
Figure 6:
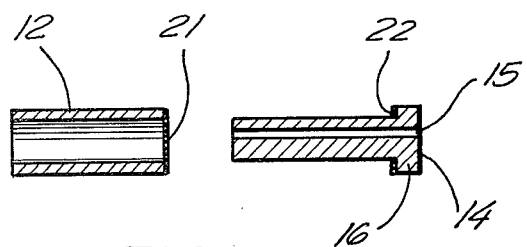
FIG. 6 is a sectional view of an engaging portion.

The size of the bicycle frame having the described construction can be adjusted to suit the body size of the rider in a manner explained hereinbelow. For instance, as shown in FIG. 3, the maximum frame size is obtained by positioning the bore 15 of the eccentric collar 14 adjacent to the down tube 6. To the contrary, the minimum frame size is obtained by locating the bore 15 of the eccentric collar 14 adjacent to the seat tube 3.

It is thus possible to obtain a displacement of an amount equal to double the eccentricity of the eccentric collar 14 at the down tube bracket 7 of the down tube 6. This displacement is amplified and appears as a greater displacement at the position of the head pipe 9 to which the handle bar (not shown) is attached.

The displacement can be doubled by providing the eccentricity not only in the front bearing 12 but also in the rear bearing 13 of the top tube 11.

As has been described, according to the invention, the position of the down tube bracket of the down tube 6 is displaced by means of the eccentric collar 14, so that it is possible to amplify the displacement. In addition, even if the eccentric collar 14 is accidentally rotated as a result of loosening of the collars 14,17 and the tightening bolts 19,20, the displacement is maintained within a given range so that the dangerous disassembling of the frame, which is often experienced in bicycles having ordinary adjusting device consisting solely of screws due to insufficient tightening torque on the screw exerted by riders unfamiliar with mechanisms, is completely avoided.

As will be understood from the foregoing description, according to the invention, it is possible to displace the head tube of the bicycle by an easy operation to permit the adjustment of the bicycle frame to meet the size of the rider's body, thereby to relieve the rider from fatigue while enhancing safety.

I claim:

1. In a bicycle frame comprising a chain stay means, a seat tube extending from said chain stay means, an inclined down tube pivotally connected to said chain stay means and forward of said seat tube, a top longitudinally extending element connected between said seat tube and said down tube, head pipe means mounted on said down tube, a first eccentric means connecting said top element to said seat tube and a second eccentric means connecting said top element to said down tube to thereby provide for adjusting the pivotal position of said down tube and thereby the relative position of said head pipe means relative to said seat tube.

2. In a bicycle frame according to claim 1, wherein said seat tube is adapted to mount a seat and said head pipe means is adapted to mount handle bars, whereby adjusting the pivotal position of said down tube adjusts the distance between said handle bars and said seat tube to accommodate riders of different sizes.

3. In a bicycle frame according to claim 1 wherein said chain stay means comprises a chain stay element and a hanger bracket, said down tube being pivotally connected to said chain stay element, said seat tube being connected to said hanger bracket.

4. In a bicycle frame comprising a chain stay means, a seat tube extending from said chain stay means, an inclined down tube pivotally connected to said chain stay means and forward of said seat tube, a top longitudinally extending element connected between said seat tube and said down tube, head pipe means mounted on said down tube, eccentric means connecting said top element to at least one of said tubes to thereby provide for adjusting the pivotal position of said down tube and thereby the relative position of said head pipe means relative to said seat tube, said eccentric means comprising a bearing on said top element, a collar element rotatable in said bearing, said collar element having an eccentric bore, fastening means extending into said bore, and bracket means interconnected to said fastening means and said down tube such that rotation of said collar within said bearing displaces said fastening means and said down tube.

5. In a bicycle frame according to claim 4 wherein said collar has a longitudinal length greater than the longitudinal length of said bearing, said collar having on at least one longitudinal end a section of enlarged diameter, said section having a diameter greater than the diameter of said bearing, said section having an inner surface having a convex or concave portion which engages the longitudinal end portion of said bearing.

6. In a bicycle frame according to claim 5 further comprising means on said section adapted to receive a tool to facilitate rotation of said collar.

* * * * *